United States Patent [19]

Frey

[11] Patent Number: 5,158,498
[45] Date of Patent: Oct. 27, 1992

[54] FILLING MACHINE FOR FILLING SLEEVES WITH COARSE CHUNKS OF MEAT

[75] Inventor: Albert Frey, Herbrechtingen, Fed. Rep. of Germany

[73] Assignee: Heinrich Frey Maschinenbau GmbH, Herbrechtingen, Fed. Rep. of Germany

[21] Appl. No.: 807,099

[22] Filed: Dec. 13, 1991

[30] Foreign Application Priority Data

Dec. 19, 1990 [DE] Fed. Rep. of Germany ....... 4040696

[51] Int. Cl.$^5$ ................................................ A23C 1/00
[52] U.S. Cl. ......................................... 452/44; 452/40
[58] Field of Search ..................... 452/44, 40, 41, 42, 452/43, 45

[56] References Cited

U.S. PATENT DOCUMENTS 2,693,348 11/1954 Ellermann ............................ 452/44
3,414,936 12/1968 Lugiewicz ............................ 452/44
4,944,657 7/1990 Mowli .................................. 452/44

FOREIGN PATENT DOCUMENTS 1507981 11/1970 Fed. Rep. of Germany ........ 452/44

Primary Examiner—Bruce M. Kisliuk
Assistant Examiner—Lawrence Cruz
Attorney, Agent, or Firm—Merchant, Gould, Smith, Edell, Welter & Schmidt

[57] ABSTRACT

The invention relates to a filling machine for the filling of a hose-like sleeve, in particular of a gut with filling material in the form of large pieces of meat or ham, the machine comprising a supply vat with a discharge opening, a screw conveyor with a charging section chargeable via the discharge opening, a precompression section and a degassification section, a holding device for the sleeve or gut, a separating unit and a closing device for the sleeve or gut.

29 Claims, 4 Drawing Sheets

FILLING MACHINE FOR FILLING SLEEVES WITH COARSE CHUNKS OF MEAT

FIELD OF THE INVENTION

The invention relates to a filling machine for the filling of a hose-like sleeve, in particular a gut with filling material in the form of meat products, comprising
 a supply vat with an outlet opening,
 a conveying device chargeable via the outlet opening,
 a holding device for the sleeve or gut,
 a separating unit, and
 a closing device for the sleeve or the gut.

BACKGROUND OF THE INVENTION

Known filling machines of the named kind are used in the manufacture of sausage products. Here the supply vat is charged with the filling material in the form of a pasty mass which is then transported via bucket wheel conveyors, reciprocating piston devices or the like to a portioning station.

SUMMARY OF THE INVENTION

The object of the present invention is to provide a filling machine which is suitable for the filling of hose-like sleeves with filling material in the form of coarse pieces of meat or ham parts.

This object is satisfied in accordance with the invention in that the conveying device is formed as a screw conveyor comprising a screw and a housing intended to receive coarse pieces of meat or ham parts; in that the screw conveyor has a charging section, a precompression section and a degassing section connected to a vacuum source; in that the screw conveyor comprises, at least in the region of its precompression section, a tubular housing and a compression screw which is rotatably journalled therein with its outer diameter at least substantially matched to the inner diameter of the housing; and in that the precompression section is dimensioned and shaped in such a way that the at least substantially vacuum-tight separation of the degassing section and the charging section is achieved via the meat parts which are compressed in this section.

Through this layout it is ensures that the large pieces of meat or ham parts are not comminuted by the filling machine and that undesired air inclusions in the finished product are avoided. Moreover it is ensured that a product with a throughgoing uniform cross-sectional shape is provided from the irregularly shaped meat or ham parts and is ideally suited for precise weightwise portioning, in particular by means of slicers.

The compression of the coarse pieces of meat or ham parts in the precompression section is achieved in accordance with a preferred embodiment of the invention in that the screw compartments in the region of the precompression section have a smaller volume than in the region of the charging section. This volume reduction of the screw compartments can be achieved in that:
 the screw pitch is reduced in the region of the precompression section,
 the diameter of the screw and housing is reduced in the region of the precompression section,
 the diameter of the screw shaft is enlarged in the region of the precompression section, or
 several of the mentioned features are combined with one another.

In accordance with a further preferred embodiment of the invention the volume of the screw compartments is enlarged again in the region of the degassification section following the precompression section so that a loosening of the coarse pieces of meat or ham is achieved. In this way a simplified and more through sucking away of the air which is located between the meat and the ham parts is possible in the region of the degassification section.

The degassification section is preferably enclosed by a vacuum chamber which communicates in this region with the inner space of the housing through apertures provided in the housing wall. These apertures can for example be laid out as a sieve or as an apertured sheet metal structure.

A further possibility for the layout of the degassification section lies in forming the shaft in the region of the degassification section as a hollow shaft and connecting its inner space to a vacuum source. The air which is located between the meat or ham parts is in this case sucked away through apertures provided in the hollow shaft.

Furthermore, it is possible to suck away the air which is located between the meat and ham parts by the apertures provided in the hollow shaft and simultaneously through the apertures in the housing wall.

In order to avoid the meat or ham parts transported via the screw conveyor from sticking to the compartments of the screw conveyor the inner side of the housing is, in accordance with a preferred embodiment of the invention, so laid out in the region of the conveying device that a rotational movement brought about by adhesion of the meat or ham parts to the screw compartments is counteracted. This can for example be achieved in such a way that different materials are selected for the inner side of the housing and for the screw, with smaller frictional forces then acting between the meat or ham pieces and the screw material than act between the meat or ham pieces and the material of the inner side of the housing. Another possibility lies in the provision of rifling or male splines at the inner side of the housing, with the rifling or male splines extending at least substantially in the direction of the screw shaft.

These male splines can, in accordance with a further preferred embodiment of the invention, be used to form a sieve-like device in the housing wall in the region of the degassification section by guiding the male splines in front of apertures provided in the housing wall.

Furthermore, the male splines can be used with a suitable choice of material in order to journal the screw of the screw conveyor in the interior of the housing.

In a further preferred embodiment of the invention the screw is provided at the drive side in a shaft bearing and is journalled within the housing in guide elements provided at the inner wall of the housing and distributed over its periphery. These guide elements are preferably formed as ring-like plastic sleeves which are chamfered at their end faces perpendicular to the conveying direction in order to ensure a problemfree transport of the filling material. Through this embodiment of the invention one achieves a full area free outlet cross-section of the screw which ensures that large pieces of meat can leave the screw unhindered.

BRIEF DESCRIPTION OF THE DRAWING

An embodiment of the filling machine of the invention will be described in the following by way of example with reference to the accompanying drawings in which.

Figure 1:
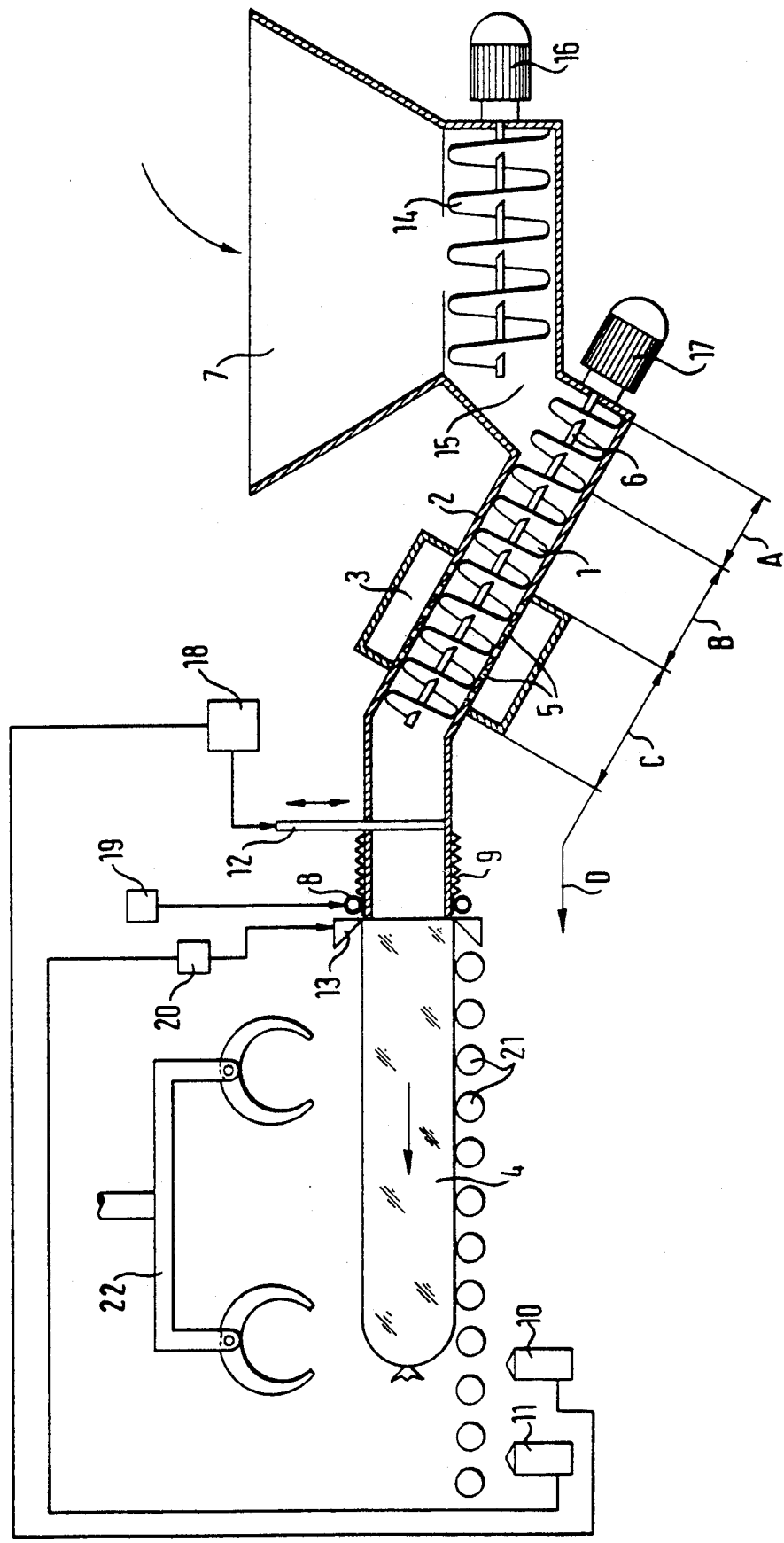
FIG. 1 is a partly sectioned sideview of a filling machine in accordance with the present invention.

This drawing shows a supply vat 7 which is filled in the direction of the arrow with large pieces of meat or ham parts. In the base region of the supply vat 7 there is located a supply device in the form of a transport screw 14 which is driven by a motor 16.

DESCRIPTION OF THE PREFERRED EMBODIMENT

The screw compartments of a screw 1 belonging to a screw conveyor are charged via the outlet opening 15 of the supply vat 7. The screw 1 is driven by a motor 17 and is journalled in a housing 2. The screw conveyor comprising screw 1, housing 2 and motor 17 has a charging section A, a precompression section B and a degassification section C. The housing 2 is provided in the region of the degassification section C with apertures 5 by which the inner space of the housing communicates in this region with a vacuum chamber 3 which surrounds a corresponding region of the housing 2.

A compression section D and a separating device 12 follow the degassification section C of the screw conveyor. The separating device is formed as a slide gate and can be actuated in the direction of the arrow via control device 18 which stands in communication with a sensor 10.

After the separating device the sleeve or gut to be filled is fitted onto the housing 2. In this region a control device 8, 19 is provided for the controlled withdrawal of the sleeve or gut 9 to be filled. This control device has a hose 8 which extends in ring-like manner over the outer periphery of the housing 2, with the sleeve or gut 9 to be extracted being guided between the hose 8 and the housing 2. The filling pressure of the hose is regulatable via a control unit 19 and an enlargement of the filling pressure brings about a greater pressure of the hose 8 on the housing 2, and thus also on the sleeve 9 which is guided between the hose 8 and the housing 2. As the withdrawal of the sleeve 9 to be filled from the housing is made more difficult with an increase of the filling pressure of the hose 8, a pressure can be built up during filling in the region of the compression section D opposite to the filling direction, and ultimately ensures a densely and tightly packed meat or sausage product.

A closing device is located behind the separating unit and comprises a mechanical closure unit 13 and the control unit 20 which is connected to a sensor 11. A roller track 21, along which the filled sleeve or filled gut 4 is moved, follows the closing device. A grasper 22 for picking up the finished sausage or meat products from the filling machine is located above the roller track 21.

In the operation of the filling machine of the invention the supply vat 7 is filled with filling material in the form of large pieces of meat or ham.

The motors 16 and 17 which drive both conveyors 14 and 1 run continuously, with the screw 14 transporting the filling material out of the supply vat 7 via the discharge opening 15 to the charging section A of the screw 1. From the charging section A the filling material passes to the precompression section B of the screw 1 where it is compressed in such a way that the charging section A is essentially separated in vacuum-tight manner from the degassification section C following the precompression section B.

In the degassification section C the air which is present between the individual parts of the filling material is sucked away by means of the vacuum chamber 3 through the apertures 5 in the housing wall.

The filling material is subsequently compressed in the region of the compression section D and is subsequently transported past the separating unit 12, 18, the control device 8, 19 and the closing device 13, 11, 20 into the sleeve 4. The control device 8, 19 which prevents the withdrawal of the sleeve 9 threaded onto the housing 2 ensures that the sleeve can only be withdrawn by applying a force which is produced in accordance with the advance of the screw conveyor and acts in the filling direction. The interplay of the feed force and of the holding force which counteracts it, and which is brought about by the control device 8, 19 ensures that the individual pieces of the filling material lie compactly against one another in the filled sleeve and thus that a firm filling of the sleeve is achieved.

When the front end of the filled sleeve 4 reaches the sensor 10 the slide gate 12 is moved into the housing via the control device 18 and is subsequently withdrawn again in order that the filling material or product unit which is to be filled can be separated from the subsequent product unit. That is to say the slide gate 12 effectively cuts through coarse pieces of meat located beneath it and is then immediately withdrawn again so that the screw 1 can continue to press the meat product into the sleeve 9.

When this separating position which is provided by the slider 12 has moved during the filling process, which is continuously taking place, up to the closing device 11, 20, 13, then the end of the filled sleeve 4 is located at the level of the sensor 11. The sensor 11 senses the front end of the filled sleeve and as a consequence actuates the closing unit 13 via the control unit 20. This is possible since the spacing between the slider 12 and the closing unit 13 is simultaneously the same as the spacing of the two sensors 10, 11, whereby it is ensured that a closing of the sleeve takes place precisely when the separating position provided by the slider 12, i.e. the rear end of the sausage or filled sleeve is located precisely at the level of the closing unit 13. Because the meat product, and in particular the chunks of meat, has (have) been cut through by the slide gate, the closing device is able to neatly separate one sausage unit from the next without tearing or crushing of the chunks of meat.

The sensors 10 and 11 can be any convenient sort of sensor such as an inductive or capacitive sensor. Alternatively the sensors 10, 11 can be realised as light barriers. In the latter case the sensors 10 and 11 shown in FIG. 1 can be thought of as light receivers adapted to receive light from respective light sources provided on the opposite side of the sausage from the receivers themselves.

During a closing process carried out by the closing unit 13 both the rear end of the sleeve of a completed filled product unit and also the front end of the sleeve of the subsequent product unit which is still to be filled is closed.

A knife and/or a pair of clamping devices can be integrated into the closing unit 13 to separate the rear end of the sausage such as has just been completed from the front end of the next sausage to be completed while preserving the closed state of both the rear end of the front sausage and the front end of the next sausage. When using a knife and two clamping devices (not shown) the knife cuts the sleeve between the two clamped positions. The clamping devices can also be designed to secure two wire clamps around the sleeve at the rear end of the front sausage and at the front end of the next sausage respectively, such wire clamps being known per se.

After termination of a closing process the finished product is removed from the roller track 21 by means of a grasper 21.

Various possible modifications of the invention will now be described in more detail with reference to the further drawings. First of all FIG. 2 shows a schematic longitudinal section through an alternative design of screw conveyor of FIG. 1 in which the screw conveyor has a smaller volume in the region of the precompression section B than in the region of the charging section A. This is achieved in that both the screw and the housing have a constant cylindrical shape but the screw has a smaller pitch in the region of the precompression section B than in the region of the charging section A. Because of the smaller pitch the material must necessarily be compressed on passing from the charging section A to the precompression section B.

That is to say in this embodiment the screw compartments in the region B have a smaller volume in the precompression section B than in the charging section A. It can also be seen from FIG. 2 that the pitch of the screw conveyor 1 in the degassification section C is increased again, i.e. the individual screw compartments are of larger volume in the region of the degassification section C than in the region of the precompression section B.

Moreover, it can be seen from this figure that the screw compartments which follow the degassification section C have a smaller volume than the screw compartments in the region of the degassification section C. This effectively prevents the filling pressure generated in section D from acting backwards on the degassification device.

Figure 2:
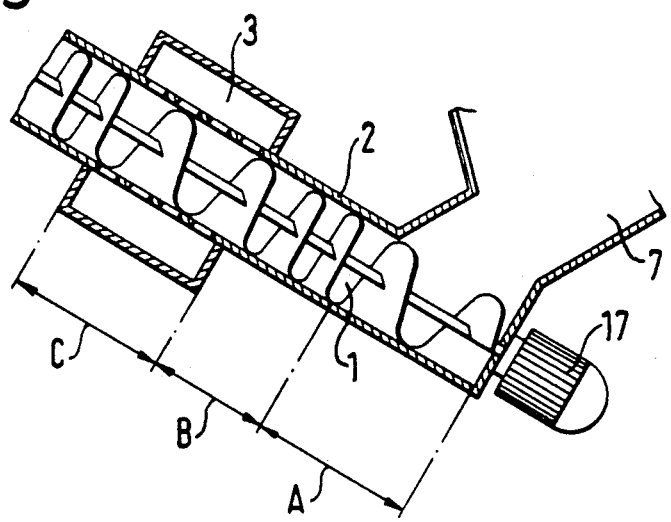
FIG. 2 is a schematic illustration of the layout of a first embodiment of a screw conveyor suitable for use in the filling machine of FIG. 1.
Figure 3:
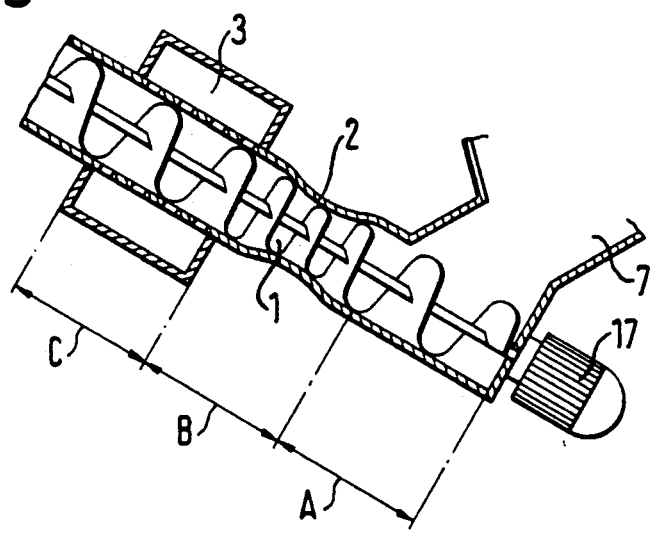
FIG. 3 is a view of an alternative embodiment of a screw conveyor suitable for use in the filling machine of FIG. 1.

FIG. 3 shows another modified screw conveyor suitable for use in the filling machine of FIG. 1 with the screw 1 having, in the present case, a smaller diameter in the region of the precompression section B than in the region of the charging section A. In this case the screw 1 in fact has a smaller pitch and a smaller diameter in the region of the precompression section B than in the region of the charging section A. It will be noted that the screw compartments again have a larger volume in the region of the degassification section C than in the region of the precompression section B.

Figure 4:
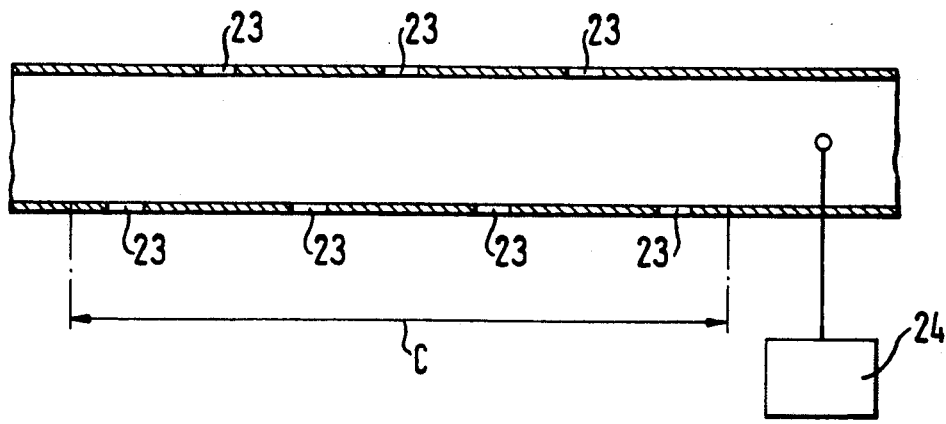
FIG. 4 is a schematic illustration of a hollow shaft suitable for use with the screw conveyor of FIGS. 1, 2 or 3.

FIG. 4 is a schematic longitudinal cross-sectional view through the degassification section C of a shaft of a screw conveyor such as that shown in FIGS. 1, 2 or 3, however, in this drawing the flights of the screw have been omitted for the sake of clarity. In any event FIG. 4 shows the apertures in the hollow shaft of the screw 1 and also shows schematically a vacuum source 24 connected to the interior of the hollow shaft.

Figure 5:
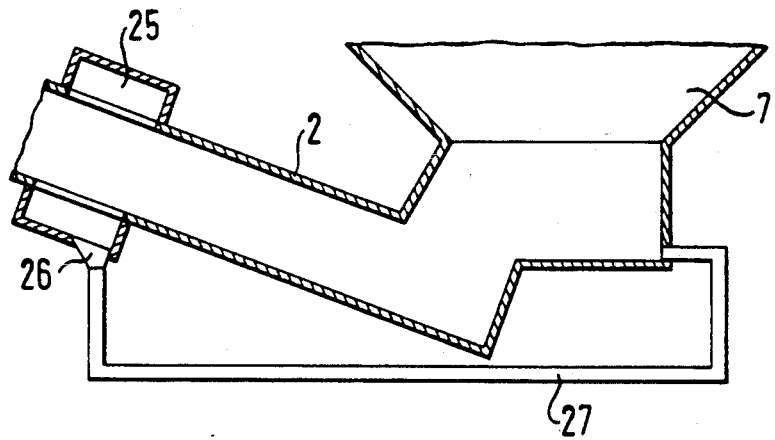
FIG. 5 shows a detail of a degassification device suitable for incorporation in the filling machine of FIG. 1.

In contrast FIG. 5 shows a degassification device 25 suitable for use with the screw conveyor of FIG. 1 (or also in any of the other figures) in which the degassification device 25 has a vacuum chamber similar to the vacuum chamber 3 of FIG. 1, but with a drain 26 at its lowermost point which communicates via a tube 27 with the flow of material which will enter the screw conveyor from the vat. Thus liquid and meat remnants which collect at the bottom of the vacuum chamber or degassification device of the screw conveyor, and which enter the drain region 26 are fed back to the inlet to the screw conveyor. Here the liquid and meat remnants are re-incorporated into the meat filling for the sausage by the mixing action of the screw conveyor. Thus 27 forms a return line from the degassification device 25 to the supply vat 7.

Figure 6:
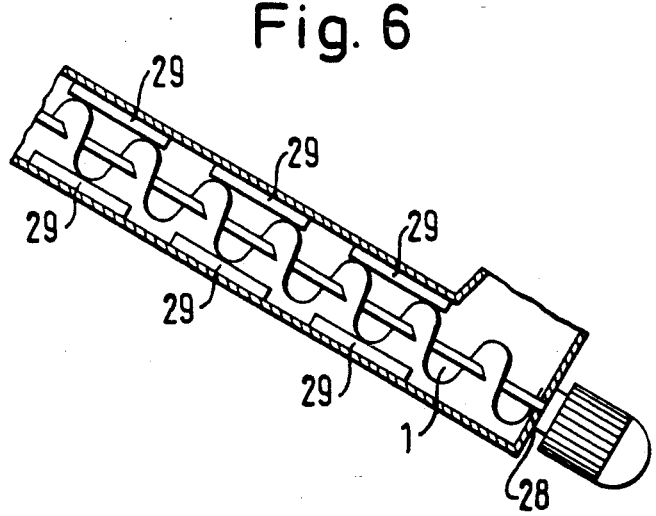
FIG. 6 illustrates an alternative screw conveyor for use in the filling machine of FIG. 1.

FIG. 6 shows a longitudinal axial section through a screw conveyor which can also be used in the filling machine of FIG. 1. It will be noted that the screw is journalled in a shaft bearing 28 provided at the drive side and is furthermore journalled in guide rings 29 provided at the inner wall of the housing. The guide rings 29 are matched to the shape of the inner wall of the housing and distributed around its periphery, they each extend over the axial length of at least one screw compartment. The inner side of the housing formed by the guide rings or elements 29 is so laid out that rotational movement of the pieces of meat to be transported is counteracted and the movement of the pieces of meat in the transport direction is promoted. This can for example be done by ensuring that a larger frictional force acts between the inner side of the housing, i.e. the inside of the guide elements 29 and the pieces of meat to be transported then acts between the screw and the pieces of meat to be transported. This can be done for example by the provision of small flutes or splines at the inner side of the housing, i.e. at the inner side of the guide elements 29.

Figure 7:
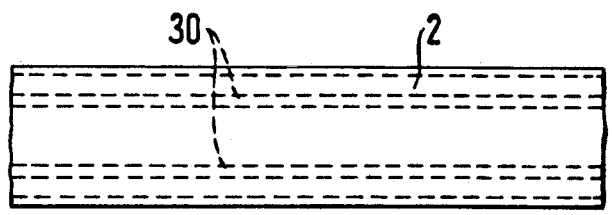
FIG. 7 is a schematic representation of a housing suitable for use with the screw conveyor of the filling machine of FIG. 1, the housing having male splines provided therein.
Figure 8:
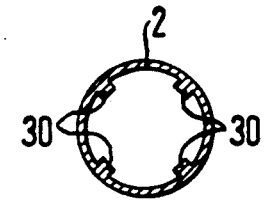
FIG. 8 is a cross-sectional view of the screw conveyor housing of FIG. 7.

Even without the provision of guide elements such as 29 it is expedient to provide splines, in particular small male splines, in the sidewall of the housing as is illustrated by the further FIGS. 7 to 11. More specifically FIGS. 7 and 8 show the provision of axially directed straight male splines 30 on the inner wall of the housing. FIG. 7 in fact shows a perspective view of the outer side of the housing and the male splines 30 are shown here in broken lines because they are not visible from the outside of the housing. The position of the male splines 30 can however be seen from the cross-section of FIG. 8.

Figure 9:
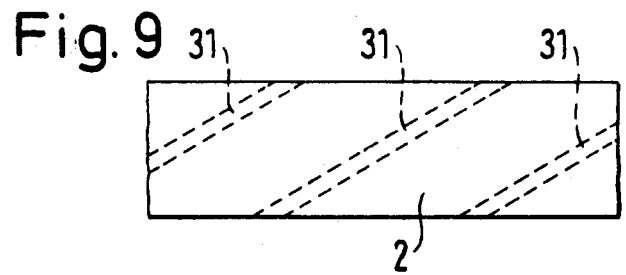
FIG. 9 is a perspective view of a screw conveyor housing similar to that of FIG. 8 but having helical male splines.

FIG. 9 shows that the male splines, here designated with reference numeral 31 can take the form of helical male splines resembling gunbarrel rifling.

Figure 10:
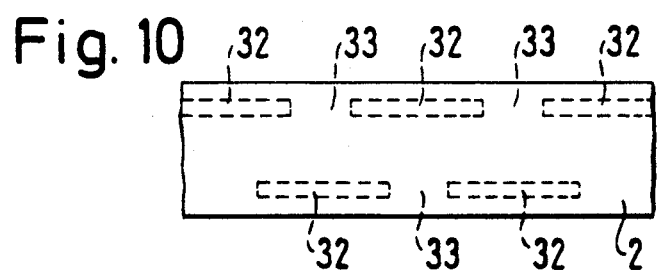
FIG. 10 is a further perspective view of a screw conveyor housing but having interrupted male splines.

FIG. 10 illustrates a different form of the male splines, here the male splines 32 are straight but are interrupted by non-splined regions 33.

Figure 11:
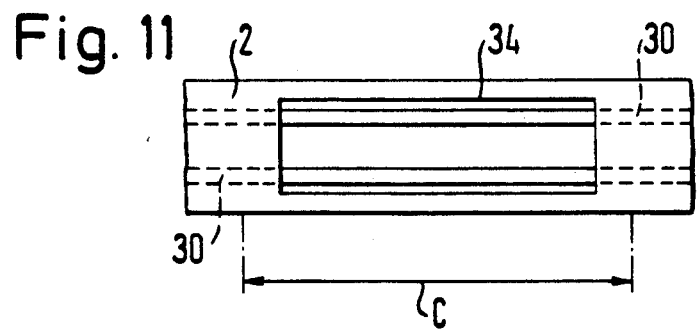
FIG. 11 is a yet further perspective view of a screw conveyor housing having male splines.

In FIG. 11 it will be seen that the male splines 30 (for example the male splines of FIG. 7) cross the apertures provided in the wall of the degassification section C, such as the aperture 34, and thus form a sieve or screen which effectively prevents large pieces of meat passing through the apertures. This facilitates the degassification of the meat product passing through the degassification section. That is to say, in FIG. 11 the male splines 30 are led in the region of the degassification section C at the inner side of the housing in front of apertures 34 in the housing wall, whereby a sieve-like device arises.

Figure 12:
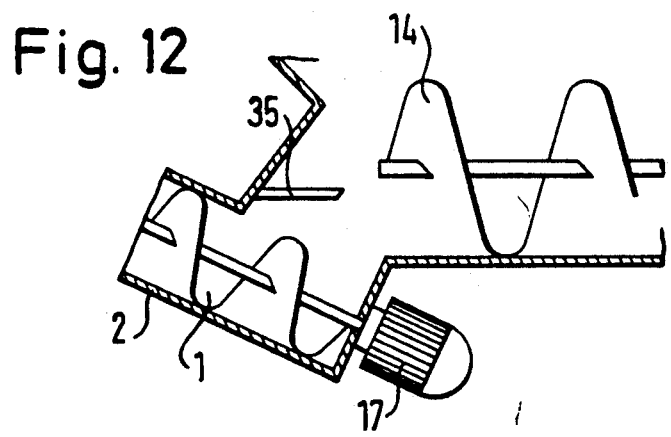
FIG. 12 shows a detail of a modified version of the filling machine of FIG. 1.

Finally, FIG. 12 shows how a deflector 35, which could indeed be a deflector of variable length or angle is provided between the transport screw 14 and the screw 1 of the screw conveyor to prevent overfilling of the first screw compartment of the screw conveyor.

I claim:

1. Filling machine for the filling of a hose-like sleeve, in particular a gut with filling material in the form of meat products, comprising
   a supply vat with an outlet opening through which the filling material may pass,
   a conveying device chargeable with filling material via the outlet opening,
   a holding device for the sleeve or gut,
   a separating unit for forming a separation in the filling material, including a separating device and a control device, and
   a closing device for the sleeve or the gut, characterized
   in that the conveying device is formed as a screw conveyor comprising a screw (1) and a housing (2) intended to receive coarse pieces of meat or ham parts;
   in that the screw conveyor has a charging section (A), a precompression section (B) and a degassing section (C) connected to a vacuum source (3);
   in that the screw conveyor comprises, at least in the region of its precompression section (B), a tubular housing (2) and a compression screw (1) which is rotatably journalled therein with its outer diameter at least substantially matched to the inner diameter of the housing, wherein the filling materials are compressed and a generally vacuum-tight seal is formed between the tubular housing (2), the compression screw (1) and the compressed filling material; and
   in that the generally vacuum-tight seal of the precompression section (B) forms a substantially vacuum-tight separation between the degassing section (C) and the charging section (A).

2. Filling machine in accordance with claim 1, characterised in that the screw (1) is axially displaceable to increase the filling pressure in dependence on the state of filling of the sleeve or gut (4).

3. Filling machine in accordance with claim 1, characterised in that the screw conveyor has a smaller volume in the region of the precompression section (B) than in the region of the charging section (A).

4. Filling machine in accordance with claim 1, characterised in that the screw (1) and its housing have a cylindrical shape and the screw has a smaller pitch in the region of the precompression section (B) than in the region of the charging section (A).

5. Filling machine in accordance with claim 1, characterised in that the screw (1) and its housing have a cylindrical shape; and in that the screw (1) has a constant pitch over its entire length.

6. Filling machine in accordance with claim 1, characterised in that the screw (1) has a smaller diameter in the region of the precompression section (B) than in the region of the charging section (A).

7. Filling machine in accordance with claim 1, characterised in that the screw (1) has a smaller pitch and a smaller diameter in the region of the precompression section (B) than in the region of the charging section (A).

8. Filling machine in accordance with claim 1, characterised in that apertures (5) are provided in the housing wall in the region of the degassification section (C); and in that the part of the housing provided with apertures (5) is surrounded by a vacuum chamber (3).

9. Filling machine in accordance with claim 1, characterised in that the shaft (6) of the screw conveyor is formed as a hollow shaft with apertures (23), at least in the region of the degassification section (C), with the inner space of the hollow shaft being connected to a vacuum source (24).

10. Filling machine in accordance with claim 1, characterised in that the screw compartments have a larger volume in the region of the degassification section (C) than in the region of the precompression section (B).

11. Filling machine in accordance with claim 1, characterised in that the degassification device (23) is equipped with a separator (26) for liquid and meat remnants.

12. Filling machine in accordance with claim 11, characterised in that a return line (27) is provided from the separator (26) to the supply vat (7).

13. Filling machine in accordance with claim 1, characterized in that the speed of rotation of the screw is variable.

14. Filling machine in accordance with claim 1, characterized in that the screw is journalled in a shaft bearing (28) provided proximate the motor (17); and in that the screw is journalled within the housing in guide elements (29) provided at the inner wall of the housing, with the guide elements (29) being matched to the shape of the inner wall of the housing and distributed around its periphery, and with the guide elements in the conveyor device each extending at least over the axial length of a screw compartment.

15. Filling machine in accordance with claim 1, characterised in that the screw compartments which follow the degassification section (C) have a smaller volume than the screw compartments in the region of the degassification section (C) in order to counteract the back action on the degassification device of the filling pressure which prevails following the degassification device.

16. Filling machine in accordance with claim 1, characterised in that the holding device for the sleeve (9) or gut (9) fitted onto the housing (2) has a control apparatus (8, 19) for the controlled withdrawal of the sleeve (9) or gut (9) which is to be filled.

17. Filling machine in accordance with claim 16, characterized in that the control apparatus has a hose (8) which extends in ring-like manner around the outer periphery of the housing (2), with the hose (8) having a controllable filling pressure, wherein the sleeve (9) to be withdrawn or the gut (9) to be withdrawn is guided between the hose (8) and the housing (2), and wherein the volume of the hose (8), and thus the pressure of the hose (8) on the sleeve or gut (9), is controllable by control of the filling pressure.

18. Filling machine in accordance with claim 1, characterized in that a first sensor (10) detects a predetermined first length of the filled gut (4) and as a consequence actuates the separating device (12), and in that a second sensor (11) detects a predetermined second length of the filled gut (4) and as a consequence actuates the closing device (13) for the sleeve or gut (4), wherein the difference between the first smaller and the second larger length is essentially the same as the distance between the separating device (12) and the closing device (13).

19. Filling machine in accordance with claim 1, characterized in that the closing device (13) closes the sleeve at the location where the separating unit forms the separation, whereby the closing device is simultaneously used as a separating unit.

20. Filling machine in accordance with claim 1, characterised in that the inner side of the housing in the region of the conveying device is so laid out that rotational movement of the pieces of meat to be transported is counteracted and the movement of the pieces of meat in the transport direction is promoted.

21. Filling machine in accordance with claim 20, characterised in that a larger frictional force acts between the inner side of the housing in the region of the conveying device and the pieces of meat to be transported than acts between the screw (1) and the pieces of meat to be transported.

22. Filling machine in accordance with claim 20, characterized in that male splines or flutes (rifling) are provided on the inner side of the housing.

23. Filling machine in accordance with claim 22, characterised in that the male splines (30) are straight.

24. Filling machine in accordance with claim 22, characterised in that the male splines (31) are of helical shape.

25. Filling machine in accordance with claim 22, characterised in that the male splines (32) have interruptions (33).

26. Filling machine in accordance with claim 22, characterised in that the male splines (30, 31) are continuous.

27. Filling machine in accordance with claim 22, characterized in that the male splines extend into the region of the degassification section (C) at the inner side of the housing in front of apertures (34) in the housing wall whereby a sieve-like device arises.

28. Filling machine in accordance with claim 1, characterised in that a supply device (14) is provided in the base region of the supply vat (7), in particular in the form of a transport screw, and feeds the charging section (A) of the screw conveyor via the discharge opening in the base of the supply vat (7).

29. Filling machine in accordance with claim 28, characterised in that a deflector (35) is provided between the transport screw (14) and the screw conveyor and prevents overfilling of a screw compartment of the screw conveyor.

* * * * *